March 6, 1934.  J. H. L. DE BATS  1,950,354
IMPROVED PRESSURE MOLDING METHOD
Filed Jan. 16, 1932
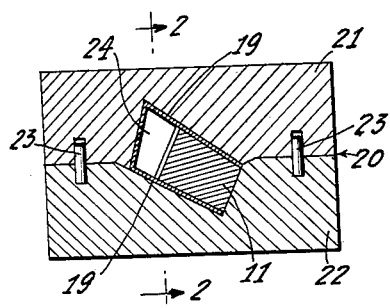
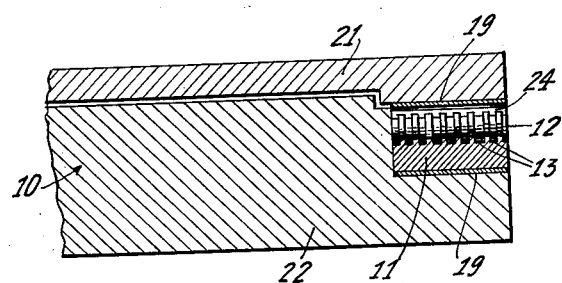
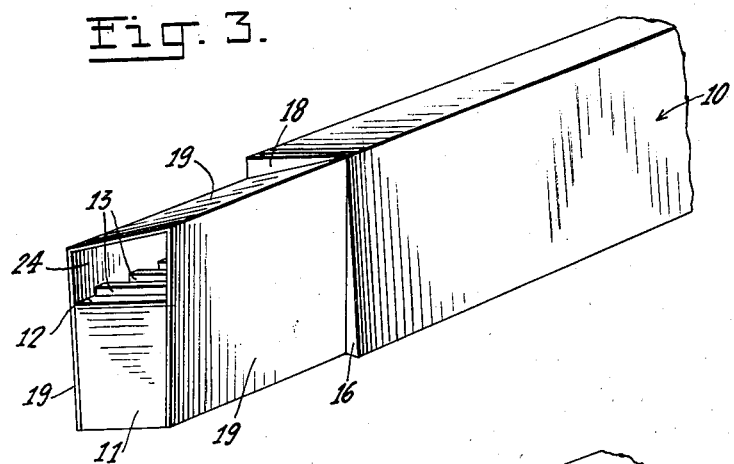
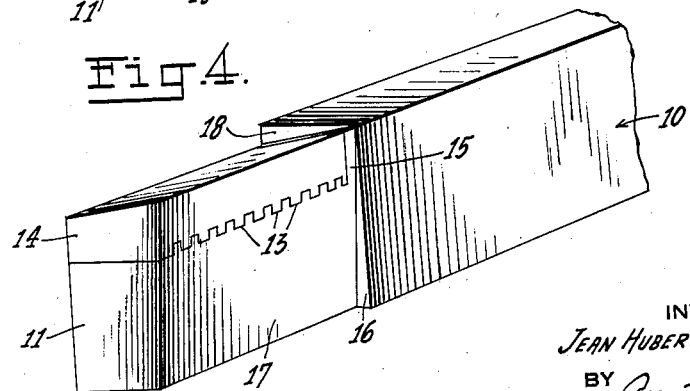
INVENTOR
JEAN HUBERT LOUIS DE BATS.
BY Austin + Rip
ATTORNEYS Patented Mar. 6, 1934

1,950,354

UNITED STATES PATENT OFFICE 1,950,354

IMPROVED PRESSURE MOLDING METHOD

Jean Hubert Louis De Bats, East Orange, N. J.

Application January 16, 1932, Serial No. 587,082

4 Claims. (Cl. 22—203)

This invention relates to new and useful improvements in articles of wear-resistant metal composition, and to improved methods of casting the same, while at the same time preserving the physical properties of the metals being cast. The invention also relates to a novel method of anchoring cast metals on a base metal or support.

Hitherto in the casting of metals, and more particularly in the application of wear-resistant materials, such as tungsten carbide compositions bonded by cobalt or like metal or bonding material, to the tips of cutting tools and the like, and to dies and the like, it has been necessary to preform such cutting or wear-resistant materials and secure them to a tool body or shank as by means of a brazing material. Where hot metal is applied directly to a tool body or shank, many difficulties arise due, for instance, to shrinkage of the material with accompanying distortion.

Yet another object of this invention is the provision of a method of forming an improved tool, die or other article having a removable sheath associated therewith and adapted to impart a predetermined contour to a mass cast into a tool, die or other article.

Another object of this invention is the provision of a method of forming an improved cemented or alloyed tool nib or wearing surface which is cast in place under pressure and in the presence of a sheath adapted to impart a predetermined configuration to the cast material.

Yet another object of this invention is the provision of a method of forming a pressure cast article, cast in split moulds without fins being formed thereon.

Another object of this invention is to provide such improved process in which suitably alloyed carbide or other alloy materials are directly secured and/or locked to a suitable tool or article without the use of an intermediate cementing material or layer to thus produce a desired composite product.

A further object of the invention is the provision of an improved process for applying a wear-resisting facing to an article while the latter is held in a mould and is provided with a suitable intermediate sheath preferably disposed in the mould cavity and configured to the desired outside surface of the cutting or wearing surface.

It is also an object of this invention to provide an improved method for slowly cooling the compositions cast, or otherwise placed on cutting tools or articles.

These, and other desirable objects of the present invention will be illustrated in the accompanying drawing and described in the specification, certain preferred embodiments being disclosed by way of example only, for, since the underlying principles may be incorporated in other specific mechanical devices, it is not intended to be limited to the ones here shown, except as such limitations are clearly imposed by the appended claims.

In the drawing like numerals refer to similar parts throughout the several views, of which Fig. 1 is a vertical section taken through a split mould showing the end of a tool and an associated sheath in place;

Fig. 2 is a section taken on lines 2—2 of Fig. 1;

Fig. 3 is a side elevation of a machine tool shank having a sheath of light gauge metal fitted over the tip thereof, the tip being provided with uneven surface to allow for securely fastening the wear-resisting material in place; and Fig. 4 is a view similar to Fig. 3 showing the finished cutting tip with the sheath removed.

Referring more specifically to the drawing, the novel features of the present invention may be illustrated best by reference to the casting or forming of a cutting tip upon a machined tool. It is however, to be understood that any article may be formed having the high wear-resistant material.

A machine tool shank 10 is provided with an end 11 machined to a desired shape to give a shoulder 12 having a plurality of ridges or serrations 13 or other indentations in the surface, the function of which is to provide an anchoring support for a high wear-resistant cutting material or any suitable alloy or composition. This material or alloy is designated generally by the numeral 14. The free surface of the wear-resisting material as formed or cast provides a most satisfactory cutting surface.

The end 11 of the tool may be machined or formed with a further shouldered portion 15, which is shaped to approximately the desired rake or angle of the finished cutting material. As shown, the tool end is cut back from the body 10 at an angle of approximately 4°, as indicated at 16, to provide a surface 17 for the end portion of the tool. This cut back provides a desirable clearance for the tool. The top of the cutting surface forms an angle 18 with the top of the tool shank. This angle is substantially 5 to 6°, but may be of other angles, if desired. The angles noted provide a desirable allowance for grinding to finish dimensions.

In carrying out the invention herein, one of the prior difficulties of the casting methods is that the cast material becomes welded to the mould. It has been here found that this disadvantage has been overcome by providing a suitable sheath 19, preferably of light gauge metal, which is shaped to approximately the desired dimensions of the cutting portion of the tool as determined by the sections 16 and 18, and which, in effect, has its interior surface shaped to give a desired finished surface and size to the tipping material for the tool. After casting there will be required but the usual slight finish grinding and/or polishing to remove the superficially oxidized coating. The sheath may be formed of sheet metal suitably shaped, or of tubing fitted over the tool after having been approximately shaped. The sheath may be secured to the tool end or mould in any desired manner. For example, it may be secured to the tool end by shrinking. Spot welding may also be employed, or the sheath may be held in place by the mould.

The improved tipping material or facing material adapted to be used in the practice of the present invention comprises a normally refractory tungsten carbide base material or other high melting material which is normally unworkable even at high heats, due to the mineralogical hardness of the material. In the practice of this invention, it has been found that wear-resisting alloy compositions of 60% to 97% tungsten carbide, with the balance of an alloyable metal of the group comprising any of cobalt, nickel or iron, may be made use of. Due to the flexibility of the present process, a wide range of alloy compositions may be used, all of them being comprehended under the general term refractory metallic compositions. These compositions are normally unworkable and special operating procedures have suggested for securing nibs thereof on cutting tools by means of brazing inserts between the nibs and the tool bodies. The direct application of a refractory material under high pressure and while in a plastic or plastifiable condition, has not been hitherto disclosed.

As shown in Figs. 1 and 2, the tool and associated sheath are disposed in a split mould 20, comprising abutted portions 21, 22, having a central portion for receiving the tool end and the accompanying sheath 19. The mould parts may be secured together in any desired fashion, as by means of centering or aligning pins 23. This mould assembly may be incorporated in a centrifugal mould or casting machine, or placed in a compression mould and the tipping material or composition 14 introduced into the mould space 24 formed by the sheath and the end 11 of the tool, and compacted therein by suitably applied pressure.

By the use of a protecting sheath in a split mould, as shown, the formation of fins of extruded metal, of high wear-resisting compositions, at the edges of the several parts of such a mould, is avoided. The smooth finish imparted by a protecting sheath to cast articles, as in the case herein, is of great practical importance as it eliminates the necessity of grinding off or otherwise removing fins formed on articles cast in split moulds of any description. Where the fins are formed of a high wear-resistant alloy including tungsten carbide or other material reacted with a metal of the group comprising cobalt, iron, nickel as a component, it will be appreciated that the removal of such fins from a pressure-cast article, is exceptionally difficult and requires operations involving considerable expenditures for equipment and labor costs. These disadvantages, as noted above, are entirely done away with by the practices of the present invention.

The method of the invention permits the use of sheathing generally in moulds to prevent the formation of fins where spit moulds of any type are used. As already noted, the use of the sheathing herein described is of particular advantage in preventing the extrusion of cast material through the cracks in split moulds where the material is forced into the moulds under considerable pressure as obtains in many of the various processes involving pressure casting.

When the mould is arranged vertically a gravity feed of molten material may be employed, or where a centrifugal casting or other pressure casting is employed, the materials may be compacted into position by suitable pressures, which may range up to several tons per square inch, depending upon the method employed. Where high pressures are used, it will, of course, be appreciated that the cast material may be used in a semi-plastic condition. This feature is of especial advantage where it is desired to surface or tip an article with a high melting alloy composition, such as tungsten carbide or carbide compositions containing up to 100% carbides, which are alloyed with an alloying metal of the group comprising cobalt, nickel, iron.

In the preparation of the castings or in the preparation of small or large billets directly by casting, the mould may be provided with a suitable sheath or metal lining which may be appropriately tubular in form and shaped to fit the mould. The interior of such a sheath may be coated, if desired, with a suitable material, such as shellac or the like to assist in so far as possible, in preventing adherence of the casting to the metal of the sheath.

By interposing a sheath of relatively thin metal between the walls of the mould and the cast material, the latter is held in position without directly welding to the walls of the mould and thereby becoming inseparable from the latter.

The sheath, besides assisting in outlining the shape of the tipping material, acts as a somewhat flexible mould wall, preventing harmful internal strains and possible rupture in the cast material itself, which would be the case if it were welded onto a rigid mould wall. It also acts to prevent a rapid heat transfer from the molten or highly heated material to the mould walls, and thus insures ample time for the relieving of any strains in the mass, due to the relatively slow removal of heat therefrom. The resulting substantial equalization of strains throughout the mass prevents cracking and spalling. The space between the mould walls and the sheath may be filled, if desired, with shims if the sheath in use is smaller than a given mould cavity.

After the cast article or composite article with its associated casting has been cooled and removed from the mould, the sheath may be removed in any suitable manner, as by grinding or machining. If the casting is of a chemical-resistant composition, the sheathing may be removed by chemical means.

The use of a protecting sheath in direct contact with a cast metal or alloy composition and with the walls of the mould, very materially reduces mould replacements, thereby permitting a marked saving in mould cost due to the increased life of the moulds. Also, the use of the sheath permits the direct formation of substantially definite and accurately shaped articles by casting, requiring only a final finish grinding or buffing to secure the desired final size.

The protected sheaths may, if desired, be made of a metal or material which does not alloy with the material to be cast nor with the mould surfaces. In such instances the sheath may be removed from the finished article without difficulty and may be used repeatedly. Where suitable heat resistant materials are used, the sheaths may be made up as more or less permanent members and used as a matter of routine practice.

Where a sheath is used the cast articles may be formed directly by casting metal from a tilting furnace or ladle and the resulting billets will have the desired and positive dimensions defined by the sheath metal structure as supported by the mold. Under the foregoing conditions no distortion of the sheath has been discovered.

When this invention is employed in making small or large billets by thus casting the metal into metal sheets or tube sheathing, it has been found that the castings are superior in composition and structure. Such adaptations of this improved method eliminates the various operations of shearing, re-melting and soaking in the usual soaking pits, and such billets may be directly applied to the rolling mills.

The method of casting including a sheath as comprehended by the present invention, causes, among other desirable results, uniformity of and a permanent set of the cast metal produced by slow cooling, as well as permitting the direct production of structural shapes, as desired, without the probability of their cracking or breaking, because of any internal stresses due to sudden cooling.

Any desired shape of cutting or wearing surface may be secured by suitably shaping the sheath, and any desired supporting or backing means associated with it. The sheath may be made of sheet metal of suitable gauge, bent into the form of the mould, tool, or other article to be surfaced.

Any desired method of introducing the metal into the mould may be employed, such as forcing it in by hydraulic pressure or air power, or the plastic or semi-plastic or fluid material may be shot into the mould in order to secure a desired contact force of the material with the serrations or locking members of the element to be surfaced. In addition, as indicated above, the material may be cast centrifugally, in which method, forces or pressures of very high order are obtainable. Such forces are variously estimated at from gravity in an open mould to 250 tons per square inch in a pressure mould, or to the maximum pressure attainable in a centrifugal mould.

Where it is desired to provide the facing material with a shape or surface different from that obtainable in an available mould, the sheath may be built up internally to give the desired surface. This feature is of advantage in custom work where special shapes may be required whether formed centrifugally or by other pressure systems. Another feature is the use of welder's carbon paste, or other materials, in a sheath to give the moulding surface. Of course, other well-known methods for securing the desired surface may be employed. Such built-up sheaths may be employed generally where it is not desirable to construct moulds having the requisite shape.

The direct extrusion of hot metal compositions upon tool shanks instead of brazing tips or pieces of cutting or wearing alloys, as is the present practice, is made possible by the novel locking means formed on the shanks. These means, as pointed out above, comprise ridges 13, which are machined in the tool. By peening or mushrooming the tips of these ridges a further improved locking means is provided. The tool end may be otherwise formed or made irregular to provide suitable securing surfaces.

Any desirable complementary rakes and angles may be formed before the heat treatment of the shank. The tips produced according to the present method will remain in position longer under normal or specific operating conditions for any designed tool due to the improvements in the material and the method of applying and securing the same to such tools.

It will now be appreciated that there has been produced an improved composite product, and that there has been disclosed an improved method for casting or extruding metals and alloy compositions having desired finished surfaces and uniform characteristics, which method is particularly suited for the casting of materials high in cutting components. The so-formed articles are characterized by being securely fastened directly to the supporting parts of the article or composite product.

It will also be noted that this sheathing method, causes, among other advantageous characteristics, a permanent set of the metal by slow cooling, and also permits of desired structural shapes without the probability of cracking or breaking, and gives uniformity of the cast metal.

While the invention herein is disclosed in one or more forms, it is to be understood that various changes and modifications may be made, but such changes or modifications must come within the spirit and scope of the invention as defined in the claims herewith.

What is claimed is:

1. In the casting of wear-resistant materials upon tool and die bodies in pressure molds, the method of protecting mold surfaces comprising conforming a sheath of sheet metal to the mold surfaces, attaching said sheath to the tool body, positioning said body and its sheath in said mold, securing the same in position, and pressure casting molten metal composition in the sheath.

2. The method of forming a cutting facing of a refractory metal composition on tools, comprising forming a tool shank having a shouldered cutting facing receiving portion and serrations on said shoulder adapted to provide locking means for the cutting refractory metal composition; placing a sheath of sheet metal around said shoulder to form a dam; placing said sheathed tool body in a mold, and casting a metal composition in the sheath while rotating the mold.

3. The improved method of securing facings of cutting and wear-resisting alloy compositions of 60 to 97% of tungsten carbide, with the balance of an alloyable metal of the group comprising any of cobalt, nickel, and iron, comprising machining a tool body to form a plurality of ridges thereon, securing a sheathing member about said ridges and in a manner to form a mold with the tool body, inserting the machined and sheathed tool body in a split mold, and pressure casting said alloy compositions in said split mold and in intimate contact with the said ridges.

4. The improved method of securing facings of cutting and wear-resisting alloy compositions of 60 to 97% of tungsten carbide, with the balance of an alloyable metal of the group comprising cobalt, nickel, and iron, comprising machining a tool body to form a plurality of ridges thereon, mushrooming said ridges, securing a sheathing member about said ridges and in a manner to form a mold with the tool bodies, inserting the machined and sheathed tool body in a split mold, and pressure casting said alloy compositions in said split mold and in intimate contact with the said ridges.

JEAN HUBERT LOUIS DE BATS.